United States Patent [19]

Ruhter

[11] Patent Number: 4,727,353

[45] Date of Patent: Feb. 23, 1988

[54] MONITOR DISPLAY SYSTEM

[75] Inventor: Martin L. Ruhter, Dubuque, Iowa

[73] Assignee: Deere & Company, Moline, Ill.

[21] Appl. No.: 6,482

[22] Filed: Jan. 21, 1987

[51] Int. Cl.$^4$ .............................................. B60Q 1/00
[52] U.S. Cl. ................................ 340/52 F; 340/525;
340/815.15; 340/815.2; 340/815.21
[58] Field of Search .................. 340/52 F, 52 R, 52 S,
340/815.15–815.22; 307/10 R; 364/424, 551

[56] References Cited

U.S. PATENT DOCUMENTS

| 3,155,950 | 11/1964 | Foster | 340/52 S |
|---|---|---|---|
| 3,457,559 | 7/1969 | Hubbard | 340/52 S |
| 3,566,401 | 2/1971 | Smith et al. | 340/52 F |
| 3,582,949 | 6/1971 | Forst | 340/52 F |
| 3,866,166 | 2/1975 | Kerscher, III et al. | 340/52 F |
| 3,995,268 | 11/1976 | Ferrari | 340/52 R |
| 4,053,868 | 10/1977 | Cox et al. | 340/52 F |
| 4,072,925 | 2/1978 | Yashima et al. | 340/52 F |
| 4,184,146 | 1/1980 | Fratzke et al. | 340/52 F |

Primary Examiner—Donnie L. Crosland
Attorney, Agent, or Firm—Henderson & Sturm

[57] ABSTRACT

A monitor display system for giving warning of the existence of an undesirable state of one or more of a plurality of monitored operating conditions of an engine-powered vehicle. The system comprises a self-contained logic circuit which energizes both master warning lamps and an audible buzzer providing a two-level warning by discerning the severity of the operating condition, and a display panel-fault indicator module including a fault indicating circuit as a part thereof electrically connected with each operating condition by a pair of sensing switches of different actuation settings, and with the module having a componetized design which provides infinite display panel shapes and formats for non-dedicated display of monitored conditions.

9 Claims, 8 Drawing Figures

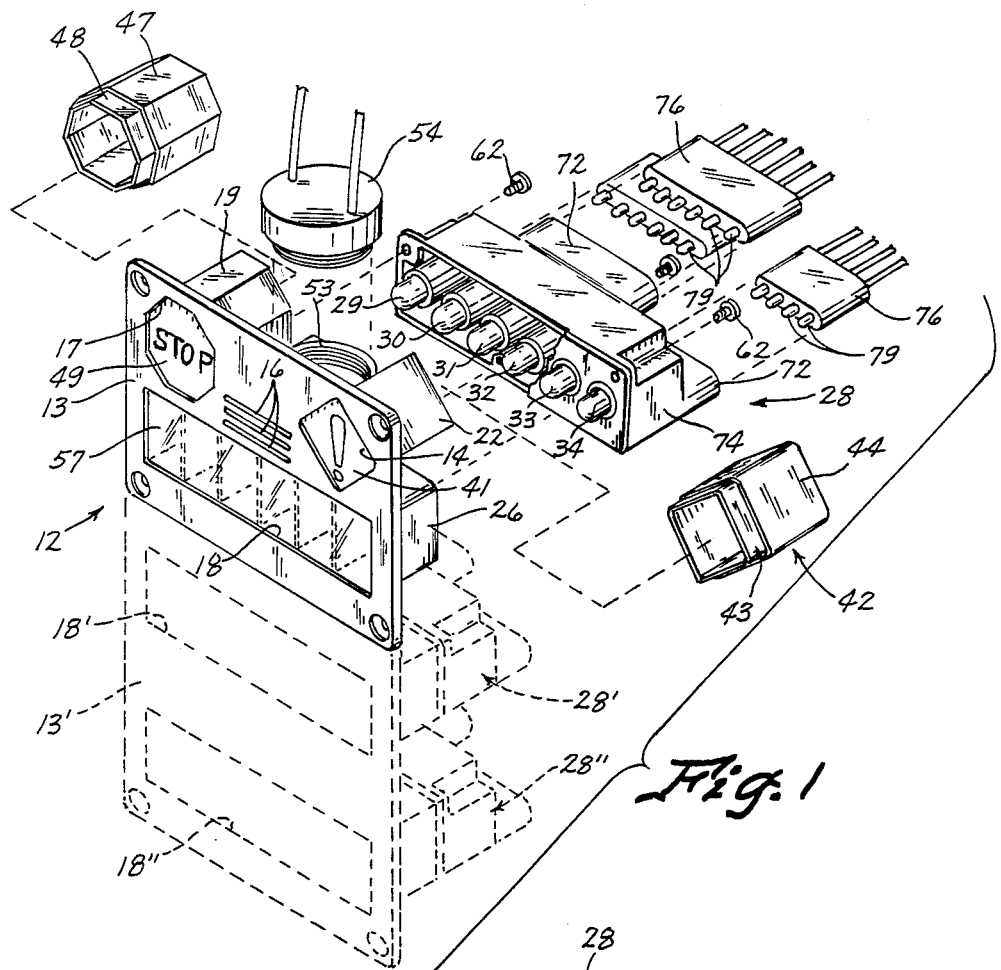
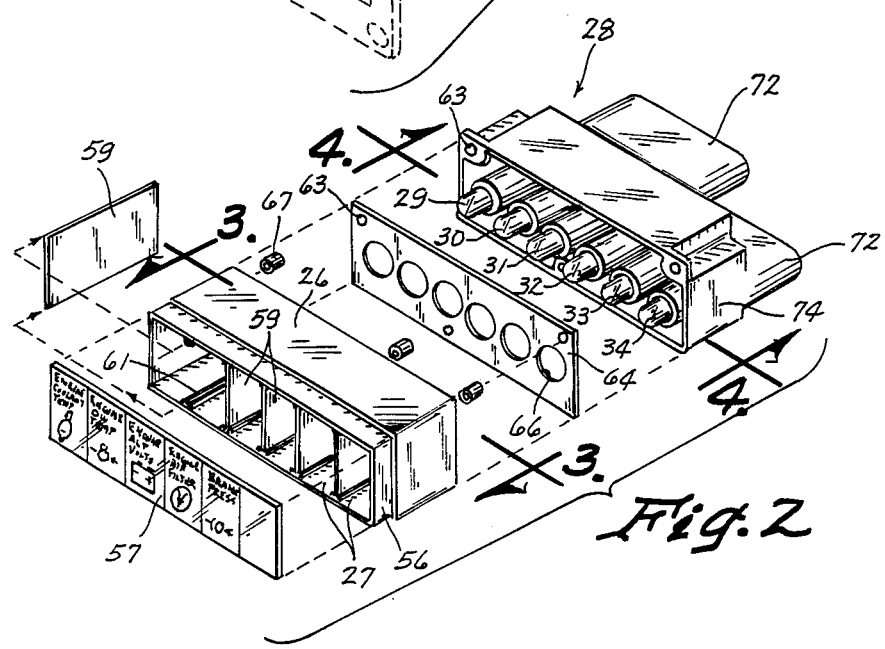

MONITOR DISPLAY SYSTEM

TECHNICAL FIELD

This invention relates to display systems for giving warning to the operators of an engine powered vehicle of predetermined operation conditions of the vehicle, and particular to a combined warning display and circuitry arrangement having a componetized design which provides infinite display panel shapes and formats for a non-dedicated display of the monitored conditions.

BACKGROUND OF THE INVENTION

In engine-powered vehicles of all kinds, monitor devices are employed to detect the presence of various undesirable operating conditions, such as overheating of the engine, low oil pressure, low fuel and the like, and indicators are provided to give warning to the operator of such conditions. In some vehicles similar instruments are provided to indicate operating faults distinct from the engine. As, for examples, earthmoving vehicles often have an engine-powered pump which supplies pressurized fluid to hydraulic cylinders for manipulating elements of the vehicle; instruments may be present to indicate low levels of hydraulic fluid, a clogging of the hydraulic fluid filter, and so on.

The importance of the various monitored conditions usually varies as to criticality. For example, the air filter for the engine or the filter for the hydraulic fluid may gradually clog during operation of the vehicle. Such clogging should be detected and the operator warned thereof, but generally there is no need to remedy the situation until the end of the day and the vehicle returns for normal servicing and maintenance. A low fuel condition requires more immediate attention on the part of the operator. A loss of engine oil pressure or a loss of hydraulic fluid represent conditions which require immediate attention to protect the vehicle from damage.

Heretofore, monitor systems have detected the presence of undesirable conditions and then signaled the vehicle operator by means of dial indicators, indicator lamps of audible means. The efficiency of these systems is greatly dependent upon the operator's careful attention to all of the various indicators and upon his judgment as to which may call for immediate correction. In general, the more complex the vehicle, the greater is the number of operating conditions that should be monitored. At the same time, the more complex the vehicle, the less the time that the operator will have to observe the greater number of various indications since he will be more immediately concerned with direct vehicle operation.

Thus, with an increasing amount of instrumentation, a definite problem exists as to how the existence of undesirable conditions can be detected and presented to the operator without a need on his part to give greater attention, which he does not have, to such instrumentation and make value judgments relative to the criticality of undesirable conditions.

Until recently, monitor displays for use in this field, and in construction equipment, for example, have consisted of various electrical-mechanical gauges, warning lamps and warning buzzers. These arrangements provided flexibility in display formats across product lines and low individual component part cost. The disadvantage of these display formats are time consuming assembly, high assembly costs, large display areas—thereby reducing operator visibility, and large numbers of individual service parts. Recently, various monitor displays have been introduced that have reduced the assembly time, lowered assembly costs, reduced the display area—thereby providing improved operator visibility, and reduced the number of service parts. The negative aspects of these dedicated-consolidated displays are two-fold: (1) high component replacement cost, and (2) reduced flexibility across product lines.

DISCLOSURE OF THE INVENTION

The present invention is directed to overcoming one or more of the problems set forth above.

This invention differs from prior art by reducing component part costs while providing monitor display format flexibility and commonality across many product lines. This is accomplished by both monitor package design and circuitry design. Complimented by the circuitry design, the monitor package design has been separated into two parts: (1) a self-contained logic circuit, and (2) a monitor display assembly comprised of fault indicator lamps, two master warning lamps and an audible warning unit.

The self-contained logic circuit operates both the master warning lamps and the audible warning unit, providing a two-level operator warning. This is basic to each application or product. The monitor display assembly consists of modular units ultra-sonically welded together for various panel configurations. This is variable depending on application or product. The fault indicator lamps, located on the monitor display panel are operated by the sensor switch circuitry. This is not directly coupled to the logic circuitry. Both the self-contained logic circuitry and the componentized design of the display panel allows infinite display panel shapes and formats and a non-dedicated selection of functions to be monitored at a low individual part cost.

Other desirable features such as reduced assembly time and cost, reduced display area for improved visibility and reduced number of parts have been retained.

BRIEF DESCRIPTION OF THE DRAWINGS

These and other attributes of the invention will become more clear upon a thorough study of the following description of the best mode or carrying out the invention, particularly when reviewed in conjunction with the drawings, wherein:

FIG. 1 is an exploded perspective view from the front thereon of the monitor display assembly;

FIG. 2 is an exploded perspective view from the front thereof of the fault lamp and housing module unit;

BEST MODE FOR CARRYING OUT THE INVENTION

Figure 3:
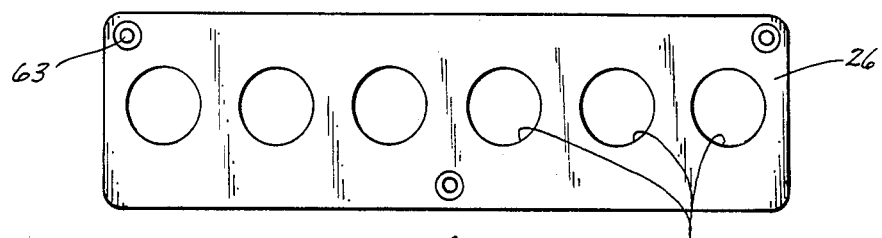
FIG. 3 is a rear elevational enlarged view of a fault lamp compartment housing.

Referring now to the drawings, wherein like reference numerals designate idential or corresponding parts throughout the several views, a monitor display system is illustrated in FIGS. 1-8 for an engine powered vehicle (not shown) having an electrical circuit for providing a source of energy, the monitor display system capable of signaling to the vehicle operator a problem or fault with one or more of the operating conditions and comprising the following components and circuits electrically connected to the circuit; a pair of sensing switches (10) and (11)(FIG. 7) mounted at each operating condition to be monitored, each sensing switch (10) and (11) having a respective predetermined actuation setting different from the other sensing switch to detect the severity of a changing operating condition.

The monitor display system includes further a monitor display assembly (12) comprising a face plate (13) (FIG. 1) having openings (14),(16),(17),(18) of predetermined sizes and shapes formed therein, a first level warning unit (19) connected to the rear of the face plate (13) including a lamp (21)(FIG. 7) visible through the opening (17) to the front thereof when energized, a second level warning unit (22) connected to the rear of the face plate (13) including a lamp (23)(FIG. 7) visible through an opening (14) to the front thereof when energized, an audible warning unit (24)(FIG. 6) connected to the rear of the face plate and audible when energized, the sound emitted through the face plate opening (16) in the form of slits formed therein.

The monitor display assembly (12) comprises further a housing (26)(FIGS. 1-3) including lamp compartments (27), the housing (26) also connected to the rear of the face place (13), a fault lamp module (28) connected to the rear of the housing (26) and including a plurality of fault indicating lamps (29-34)(FIGS. 2 and 7) each extended into one of the compartments (27) and visible through the opening (18) to the front of said face plate (13) when energized.

A fault lamp circuit (36)(FIG. 7) is mounted on a board (37)(FIG. 4) in said fault lamp module (28) and electrically connects each fault lamp (29-34) to a respective pair of sensing switches (10),(11) whereby upon an operating condition occuring which activates one, (10) or (11), of said pair of sensing devices, a fault lamp (29-34) identified with the operating condition is energized.

The monitor display system is completed by a self-contained logic module (37)(FIG. 8) containing a logic circuit electrically connected to said fault lamp circuit (36), said first (19) and second (22) level warning units, and to said audible warning unit (24); said logic module (37) electrically operable to discern which sensing device (10) or (11) of said pair of sensing devices is activated and to concurrently activate either of said level warning units (19),(22) and said audible warning unit (24) to indicate to the operator the severity of the particular operating condition at fault.

More particularly, the face plate (13)(FIGS. 1,5,6) is of a molded plastic, is rectangular and relatively flat except for mounting collars (38),(39) formed on the rear thereof, and integral therewith, for the second level warning unit (22) and the lamp housing (26), respectively. A like collar (not shown) is also formed for the first level warning unit (22). By the use of dotted lines in FIG. 1, it is readily seen that additional openings (18'), (18") and like collars, may be readily provided by this arrangement by merely elongative the face plate to a modified form (13'), whereby additional fault lamp modules (28'),(28") may be connected to accommodate the monitoring of additional operating conditions for the vehicle. Further, the face plate (13) may be widened to provide circular or like openings to accommodate gauges or the like to tailer the non-dedicated monitor display. Thus, the expandible-function monitor display is non-dedicated to any particular vehicle, and in fact accommodates a wide variety of vehicles.

The second level warning unit (22) of molded plastic comprises a diamond-shaped clear plastic element (41) (FIG. 1) having a predetermined indicia imprinted thereon and fitted within the collar (38) and at the front of a square-shaped lamp holder (42) so as to be visible at the opening (17). The holder (42) has a short neck-portion (43) which fits snugly within the collar (38) with remainder (44) extended rearwardly, and with a rear opening (46)(FIG. 6) to receive the lamp unit (21) therein.

The first level warning unit (19) of molded plastic comprises an octagonal-shaped lamp holder (47) also having a neck portion (48) adapted to snugly fit within the collar therefor (not shown) and to hold a like-shaped clear plastic element (49) to the front thereof within the opening (14) with appropriate indicia imprinted thereon, the holder (47) also having an opening (51) formed in the rear thereof for providing the securement therein of the lamp unit (23).

The audible warning unit (24) includes a chamber-forming, molded plastic housing (52)(FIG. 6) secured to the rear of the face plate (13) directly behind the opening slits (16), the housing (52) having a large threaded opening (53)(FIG. 1) formed in the top for receiving a threaded, electrically energized audible device (54). By this formation, the audible device (54) is protected from water or other foreign material entering the chamber within the housing (52), and a sounding board effect for amplifying the sound is achieved.

The lamp housing (26)(FIGS. 2,3) is also of molded plastic and further has a neck portion (56) providing a snug fit into the collar (39)(FIG. 5), and with an elongated clear plastic element (57)(see FIG. 1) having a very thin film of appropriate indicia thereon (see FIG. 2) indicating various operating conditions of the vehicle, which element (57) is fitted within the collar (39) and held in place in the opening (18)(FIG. 1) by the neck portion (56). To the rear of the housing (26), a plurality, six in this instance, of circular openings (58) are formed such that the fault lamps (29-34), usually white, clearly illuminating the particular indicia on the element (57) in front of the energized lamp. The lamp compartments (27)(FIG. 2) are formed by individual molded plastic walls (59) which slide into place within guide tracks (61)(FIG. 2) formed on the floor of the housing (26). The walls are opaque as is the remainder of the housing (26).

It is to be noted that although several conventional methods of secure connection can be used, the first level warning unit holder (47), the second level warning lamp holder (44), and the fault lamp housing (26) are all connected to their respective face plate collars by the use of ultra-sonic welding. The audible warning housing (52), for example, can be connected to the fact plate (13) as by chemical bonding.

Figure 4:
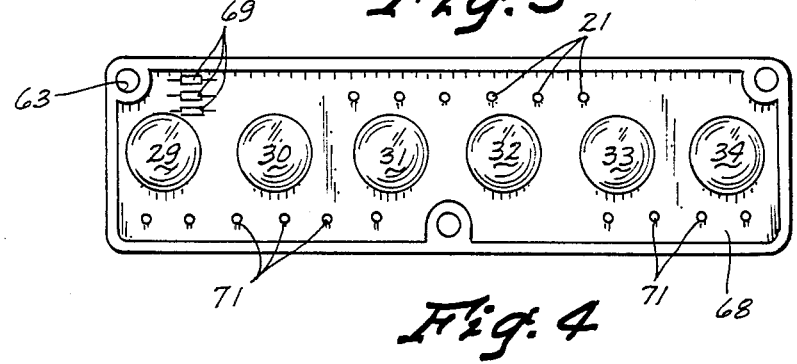
FIG. 4 is a front elevational view of a fault lamp module.
Figure 5:
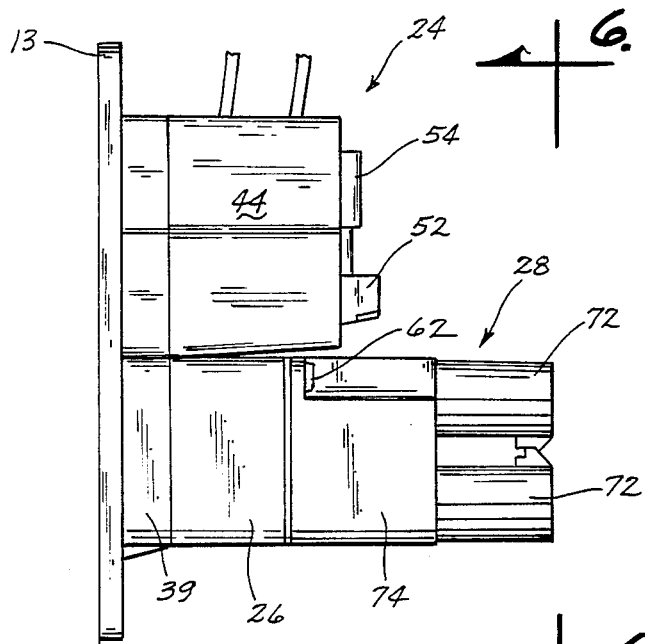
FIG. 5 is a side elevational view of the assembly of FIG. 1 as viewed from the right side of FIG. 1.
Figure 6:
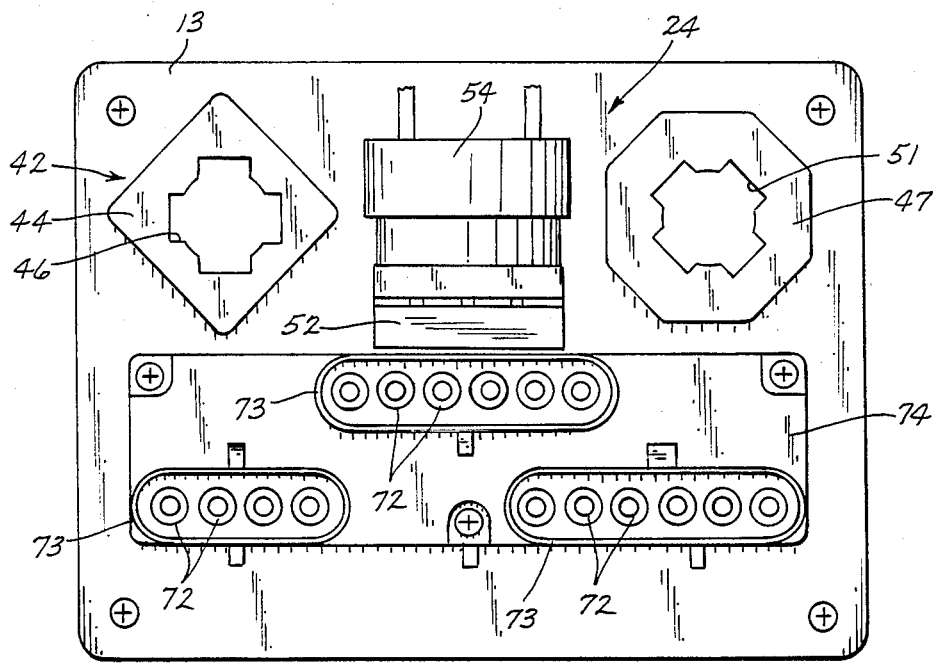
FIG. 6 is a rear elevational view of the assembly of FIG. 1.
Figure 8:
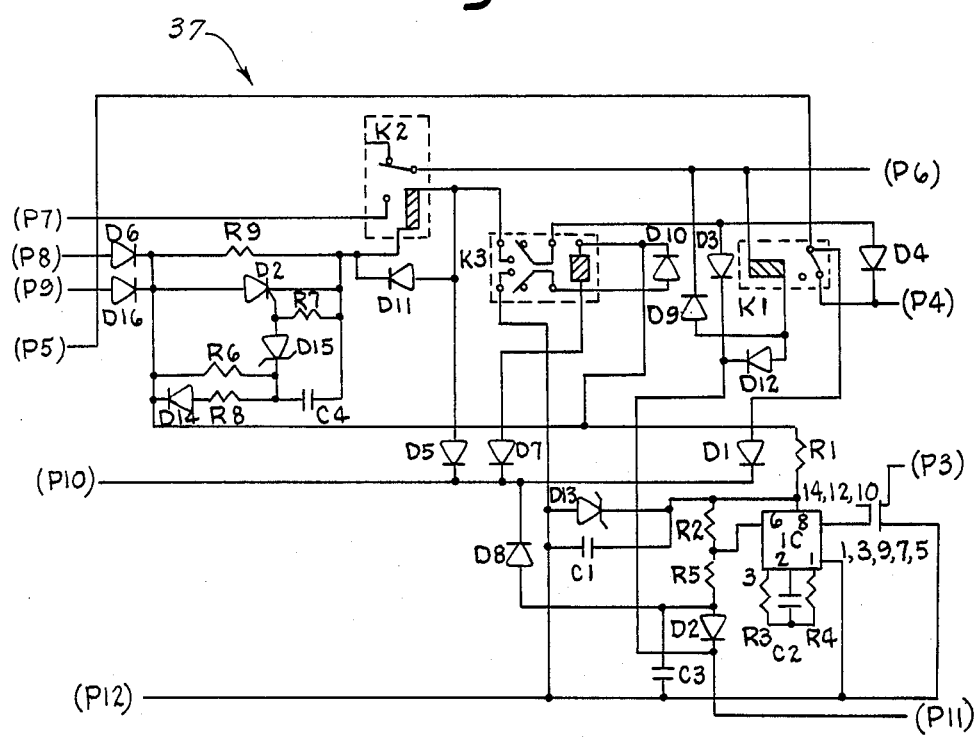
FIG. 8 is a circuit diagram showing in detail the logic module circuit of the monitor display system.
Figure 7:
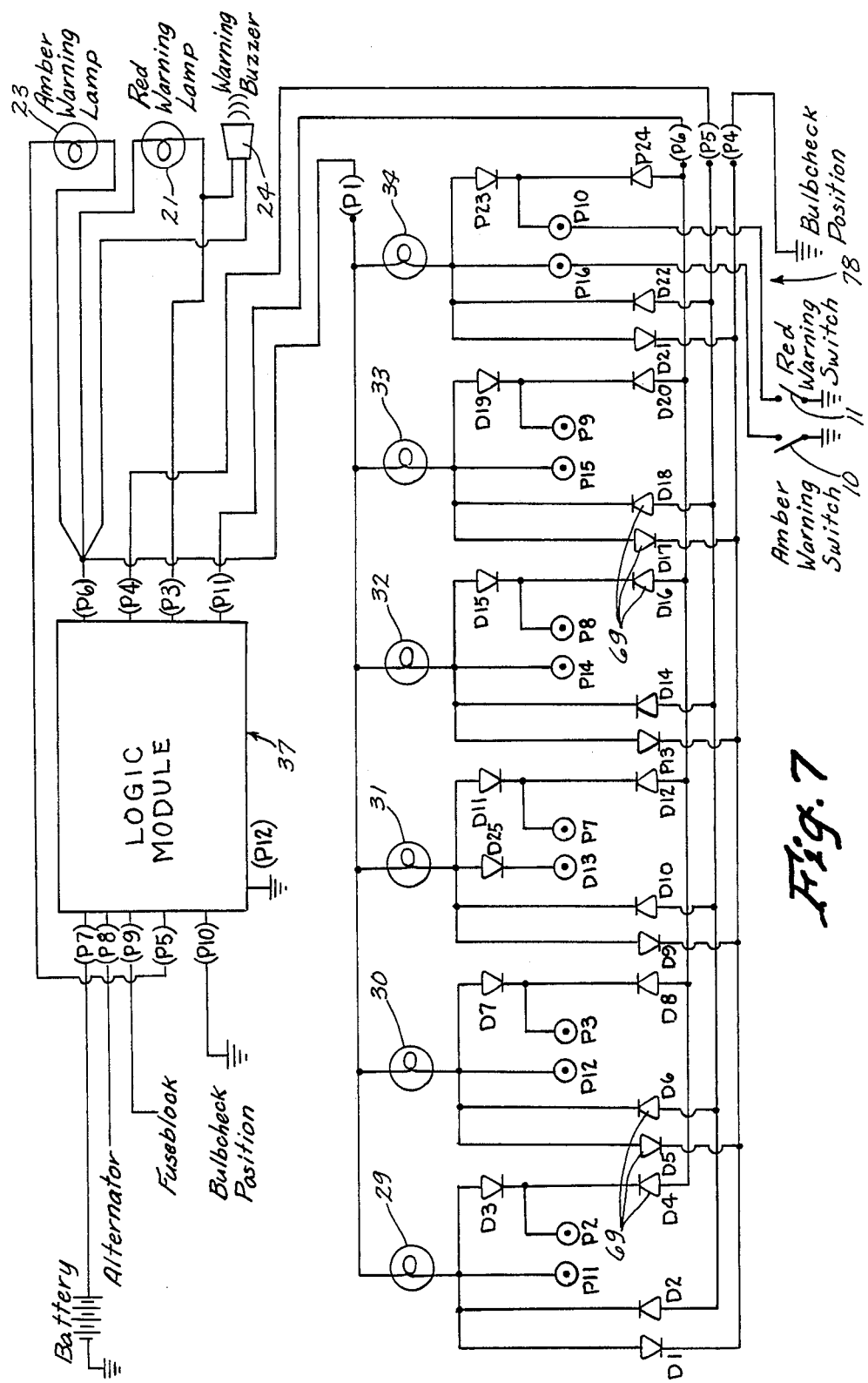
FIG. 7 is a circuit diagram of the monitor display system, showing the fault lamp circuit in detail.

Connected to the rear of the fault lamp housing (26) by screws (62) or like fasteners inserted through aligned openings (63)(FIG. 3) in a gasket (64) with lamp openings (66), and in the fault lamp module (28) is the latter module. Brass or like inserts (67) are secured in recesses (not shown) formed in the rear of the housing (26) to receive the screws (62). The fault lamp module (28) is of a molded plastic material, and has the diode circuit (26) of FIG. 7 mounted therein on a circuit board (68)(FIG. 4), three of the diodes being shown (FIG. 4). Pin terminals (71) extend through the board (68) from the rear to connect with the circuit (36) formed in normal manner on the face of the board (68), the pin terminals (71) connected in turn to female connector receptacles (72)(FIG. 6) mounted within collars (73) at the rear of end integral with the module housing (74). A trio of male electrical connectors (76) (FIG. 1) are provided for connecting the fault lamp diode circuit (36) into the remainder of the vehicle and monitor circuit. As a part of the diode circuit (36), the fault lamps (29-34)(FIGS. 1,2,4) are mounted within holders (77) affixed to the board (68), with the lamps (29-34) electrically connected to the circuit (36) formed on the board (68).

The switch sensors (10),(11) are directly connected to the fault lamp module (28) by a wiring harness (78) with sealed electrical connector ends (76). Terminals inside the electrical connectors (79) are labeled P1-P16. Normally open switch sensors (10),(11) "close to ground" to signal that various machine conditions are changing. The fault lamp module (28) provides: an electrical interface via the connectors (72),(79) with the switch sensors (10),(11); a holder (77) for each fault indicator lamp (29-34); and diode circuitry (36) to distinguish the "Level of Priority" or severity of the developing and impending failure. Incoming "grounded signals" from the switch sensors (10),(11) to the fault lamp module (28) are directed to the fault lamps (29-34) which when energized display the faulty function(s).

Concurrently, the logic module circuit (37) has access to the "grounded signal" thru the diode circuitry (36) and allows the logic module circuit (37) to distinguish the "Level of Priority" of the faulty function(s). When detecting a "grounded signal", the logic module circuit (37) provides power to energize the appropriate red "First Level" master warning lamp (21) or amber "Second Level" master warning lamp (23); and/or audible "First Level" alarm (24); and simultaneously supplies used to energize the fault lamps (29-34).

In the fault lamp module circuit (36)(FIG. 7), each lamp (34) for example has a circuit including: diode (D21) used a a ground path to energize the lamp (34) during a "bulb check" operation, diode (D22) which provides access to the logic module circuit (37) to "second level" warning signals upon upon a closing to ground of normally open switch (10) through connector pin (P16), diode (D23), which isolates the "second level" signal from the "first level" warning signal, and diode (D24) which provides access to the logic circuit (37) via pin (P10) and normally open switch (11) closing to ground.

The logic module is self-contained, the circuit (37) (FIG. 8)including: a conventional time delay circuit of diodes (D14),(D15) and (Q2); resistors (R6),(R7),(R8) and (R9) and capacitor (C4); a conventional flasher circuit for the warning units (19),(24) including integrated circuit (IC1), with the necessary pin connectors, resistors (R1),(R2),(R3),(R4),(R5), diodes (D2),(D13), capacitors (C1),(C2),(C3) and hexfet (Q1). The flashing circuit is activated when (P11) is grounded. The flasher provides a pulsing ground (P3) for the first level warning units (19),(24). Diodes (D1),(D5),(D7) and (D8) are isolation diodes used in bulb checking; and diodes (D9),(D10) and (D11) are connected across relay coils (K1),(K2), and (K3) for arc suppression. Diodes (D3),(D4),(D6),(D12) and (D16) are isolation diodes.

Relay (K1) provides a priority discernment should two differing priority signals be provided to the logic circuit (37), such that the highest "Level Priority" warning units (19),(24) will be energized. Relay (K1) normally provides a ground path (P4) to (P5) for amber warning (23), however if activated by ground on (P11), it breaks the amber warning ground circuit.

Relay (K2) provides power to the fault lamp module circuit (36)(FIG. 7) when the time delay circuit designated above closes relay (K2), with (P4) or (P11) grounded. It also provides power for the red, amber and audible warning units (21),(23) and (24).

Relay (K3) acts as a latching relay such that when pin (P10) is grounded by the ignition key switch (not shown) moving to either the bulb check position or to the vehicle starting position, relay (K3) is activated thereby arming the monitor system. This enables the key switch to be turned "on" without activating the monitor system.

A first level warning identifies operating conditions that require immediate machine shutdown, for example of a motor grader. The operator will be alerted by a flashing red warning lamp (21), pulsing audible buzzer (24) and a white fault indicator lamp (any one of 29-34) identifying the faulty function(s). The warning indicates a serious problem exists that could cause highly adverse consequences if the machine is not shutdown quickly. The operator should stop the machine, stop the engine and secure the machine immediately. These functions include, for example: low engine oil pressure, excessive engine head temperature, low brake pressure, excessive transmission oil temperature, and/or park brake engaged with transmission engaged.

A second level warning identifies operating conditions that are developing faults. The operator will be alerted by a glowing amber warning lamp (23) and a white fault indicator lamp (any one of 29-34) identifying the faulty function(s). The warning indicates a potential but not yet critical problems exists that could eventually cause a component failure. The operator should alter the machine operation or check the machine for service. These functions include, for example: high engine coolant temperature, low engine alternator voltage, restricted engine air filter, low transmission oil pressure, high transmission oil temperature, restricted transmission oil filter, restricted hydraulic oil filter, low HFWD charge pressure, restricted HDWD filter, and/or a disengaged saddle locking pin.

Obviously, many modifications and variations of the present invention are possible in light of the above teachings. It is therefore to be understood that, within the scope of the appended claims, the invention may be practiced otherwise than as specifically described.

I claim:

1. A monitor display system for an engine powered vehicle having an electrical circuit for providing a source of energy, the monitor display system capable of signalling to the vehicle operator a problem or fault with one or more of the operating conditions and comprising the following electrically connected to the circuit:

a pair of sensing switches mounted at each operating condition to be monitored, each sensing switch having a respective predetermined actuation setting different from the other sensing switch to detect the severity of a changing operating condition;

a fault lamp monitor display assembly comprising:
  a face plate having openings of predetermined sizes and shapes formed therein,
  a first level warning unit connected to the rear of said face plate including a lamp visible through an opening to the front thereof when energized,
  a second level warning unit connected to the rear of said face plate including a lamp visible through an opening to the front thereof when energized,
  an audible warning unit connected to the rear of said face plate and audible when energized,
  a housing including lamp compartments connected to the rear of of said face plate,
  a fault lamp module connected to the rear of said housing and including a plurality of fault indicating lamps each extended into a said compartment and visible through an opening to the front of said face plate when energized,
  a fault lamp circuit mounted in said fault lamp module and electrically connecting each fault lamp to a said respective pair of sensing devices whereby upon an operating condition occuring which activates one of said pair of sensing devices, a fault lamp identified with the operating condition is energized; and a logic module containing a logic circuit electrically connected to said fault lamp circuit, said first and second level warning units, and to said audible warning unit, said logic module electrically operable to discern which sensing device of said pair of sensing devices is activated and to concurrently energize either of said level warning units and said audible warning unit to indicate to the operator the severity of the particular operating condition at fault.

2. The monitor display system according to claim 1 and further wherein certain of said openings for said housings are of a common size and shape and are arranged in a columnar form of normally vertical spacing.

3. The monitor display system according to claim 1 and further wherein said first and second warning lamps are of different colors to indicate severity of warnings by internationally identified colors associated therewith.

4. The monitor display system according to claim 1 and further wherein said audible unit includes a holder attached to said face plate and provided with a threaded opening for threadably receiving an electrically energized audible unit.

5. The monitor display system according to claim 1 and further wherein said housing lamp compartments are normally arranged side-by-side, with said housing connected to said face plate.

6. The monitor display system according to claim 1 and further wherein said fault lamp module includes said fault lamps arranged normally in a side-by-side formation, with a diode circuit board mounted internally said module, and with female electrical connection plugs formed at the rear of said module for receiving male electrical plugs for activating said diode circuits.

7. The monitor display system according to claim 1 and further wherein said logic module is self-contained within a single housing such as to be separately located from other compartments of the vehicle and the monitor display system.

8. The monitor display system according to claim 1 and further whein said logic module automatically selects the highest priority warning from said fault lamp circuit and energizes the appropriate one or ones of said warning units.

9. The monitor display system according to claim 1 and further wherein said logic module includes a time delay preventing energization of said monitor display lamps for a predetermined time so as to make false intermittent signals from said sensing switches.

* * * * *